(12) United States Patent
Miyata et al.

(10) Patent No.: US 10,397,409 B2
(45) Date of Patent: Aug. 27, 2019

(54) INCOMING-CALL NUMBER NOTIFICATION APPARATUS, EXCHANGE, INCOMING-CALL NUMBER NOTIFICATION SYSTEM, AND COMPUTER READABLE MEDIUM

(71) Applicant: NEC Platforms, Ltd., Kawasaki-shi, Kanagawa (JP)

(72) Inventors: Kotaro Miyata, Kanagawa (JP); Sakae Kamimura, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/770,512

(22) PCT Filed: Jun. 12, 2017

(86) PCT No.: PCT/JP2017/021630
§ 371 (c)(1),
(2) Date: Apr. 24, 2018

(87) PCT Pub. No.: WO2018/016230
PCT Pub. Date: Jan. 25, 2018

(65) Prior Publication Data
US 2018/0227431 A1    Aug. 9, 2018

(30) Foreign Application Priority Data

Jul. 21, 2016 (JP) ................. 2016-142973

(51) Int. Cl.
*H04M 9/00* (2006.01)
*H04Q 3/58* (2006.01)

(52) U.S. Cl.
CPC .............. *H04M 9/003* (2013.01); *H04Q 3/58* (2013.01); *H04M 2203/2044* (2013.01); *H04M 2203/2077* (2013.01)

(58) Field of Classification Search
CPC combination set(s) only.
See application file for complete search history.

(56) References Cited

U.S. PATENT DOCUMENTS

2008/0119170 A1* 5/2008 Montebovi .......... G09G 3/3413
455/412.2
2014/0254776 A1* 9/2014 O'Connor ........... H04M 3/5175
379/88.01

FOREIGN PATENT DOCUMENTS

JP          62-272646 A      11/1987
JP          06-070041 A      3/1994
(Continued)

OTHER PUBLICATIONS

International Search Report for PCT/JP2017/021630, dated Jul. 25, 2017.

*Primary Examiner* — Phung-Hoang J Nguyen
(74) *Attorney, Agent, or Firm* — Sughrue Mion, PLLC

(57) ABSTRACT

An object is to provide an incoming-call number notification apparatus capable of notifying a user of the number of incoming calls at the present moment by using simpler equipment. An incoming-call number notification apparatus according to the present invention includes a control unit (14, 15) configured to, when there is an incoming call to a plurality of telephones (20) accommodated in an exchange (10), determine a display color according to the number of incoming calls at the present moment, and instruct the plurality of telephones to blink or light up an incoming-call lamp of its own telephone in the determined display color (20).

9 Claims, 12 Drawing Sheets

(56) References Cited

FOREIGN PATENT DOCUMENTS

| | | |
|---|---|---|
| JP | 07-023436 A | 1/1995 |
| JP | 2003-008753 A | 1/2003 |
| JP | 2004-304770 A | 10/2004 |
| JP | 2006-080625 A | 3/2006 |
| JP | 2006-253905 A | 9/2006 |
| JP | 2009-177249 A | 8/2009 |
| JP | 2012-084992 A | 4/2012 |

* cited by examiner

INCOMING CALL DESTINATION SETTING

| No. | RECEIVING NUMBER | INCOMING CALL DESTINATION | ASSIGNED TELEPHONES |
|---|---|---|---|
| 1 | AAAA | A-TH IMAGINARY EXTENSION LINE | TELEPHONES IN A-TH TELEPHONE GROUP |
| 2 | BBBB | B-TH IMAGINARY EXTENSION LINE | TELEPHONES IN B-TH TELEPHONE GROUP |
| 3 | CCCC | B-TH IMAGINARY EXTENSION LINE | TELEPHONES IN C-TH TELEPHONE GROUP |
| 4 | DDDD | D-TH IMAGINARY EXTENSION LINE | TELEPHONES IN D-TH TELEPHONE GROUP |
| 5 | EEEE | E-TH IMAGINARY EXTENSION LINE | TELEPHONES IN E-TH TELEPHONE GROUP |
| 6 | FFFF | F-TH IMAGINARY EXTENSION LINE | TELEPHONES IN F-TH TELEPHONE GROUP |

Fig. 4

CASE WHERE FIVE EXTENSION TELEPHONES ARE INCLUDED IN TELEPHONE GROUP

| NUMBER OF INCOMING CALLS | DISPLAY COLOR OF INCOMING-CALL LAMP |
|---|---|
| 1~5 | WHITE |
| 6 | YELLOWISH GREEN |
| 7 | BLUE |
| 8 | INDIGO |
| 9 | YELLOW |
| 10 | PINK |
| 11 OR GREATER | RED |

20: EXTENSION TELEPHONE

Fig. 6

WHEN DIAL-IN CALL ARRIVES, TELEPHONE RINGS
INCOMING-CALL LAMP BLINKS    IMAGINARY EXTENSION BUTTON BLINKS

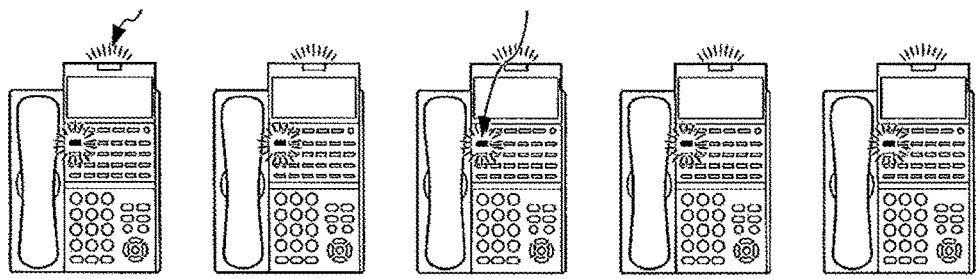

WHEN ONE TELEPHONE RESPONDS, RINGING OF TELEPHONE IS STOPPED
INCOMING-CALL LAMP IS TURNED OFF    IMAGINARY EXTENSION BUTTON OF ONLY THE
                                    TELEPHONE THAT HAS RESPONDED IS LIGHTED UP

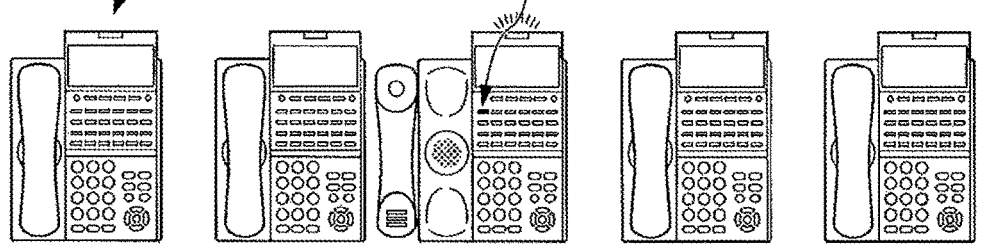

WHEN DIAL-IN CALL FURTHER ARRIVES, TELEPHONE THAT HAS NOT RESPONDED RINGS
INCOMING-CALL LAMP AND IMAGINARY EXTENSION BUTTON BLINK
                    ONLY THE INCOMING-CALL LAMP BLINKS
                    IN TELEPHONE THAT HAS RESPONDED

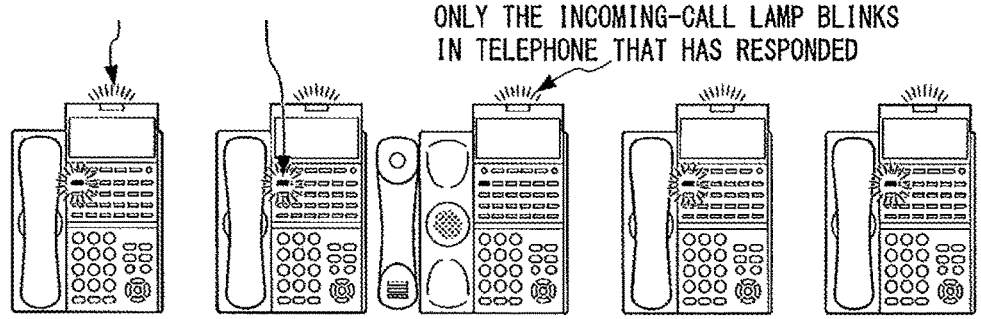

WHEN ALL THE TELEPHONES IN EXTENSION-TELEPHONE GROUP BECOME BUSY STATES, IMAGINARY EXTENSION BUTTONS ARE LIGHTED UP

IMAGINARY EXTENSION BUTTON IS LIGHTED UP

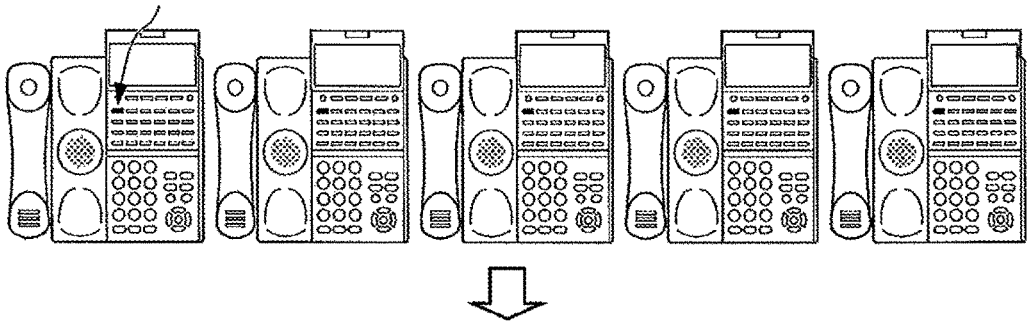

WHEN INCOMING CALL OCCURS WHILE ALL THE TELEPHONES ARE BUSY STATES, NO TELEPHONE RINGS AND ONLY THE INCOMING-CALL LAMPS BLINK
IN THIS STATE, NUMBER OF INCOMING CALLS AND NUMBER OF OVERFLOW CALLS ARE INDICATED BY COLOR OF INCOMING-CALL LAMP

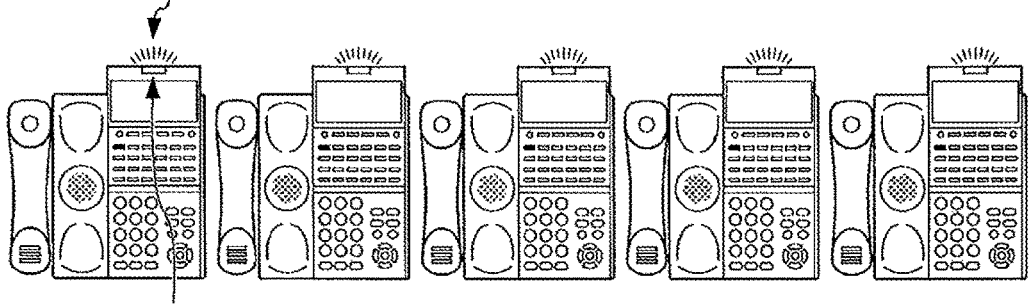

\<YELLOWISH GREEN\>
INCOMING CALLS: 6
OVERFLOW CALLS: 1

\<BLUE\>
INCOMING
CALLS: 7
OVERFLOW
CALLS: 2

\<INDIGO\>
INCOMING
CALLS: 8
OVERFLOW
CALLS: 3

\<YELLOW\>
INCOMING
CALLS: 9
OVERFLOW
CALLS: 4

\<PINK\>
INCOMING
CALLS: 10
OVERFLOW
CALLS: 5

\<RED\>
INCOMING
CALLS: 11
OVERFLOW
CALLS: 6

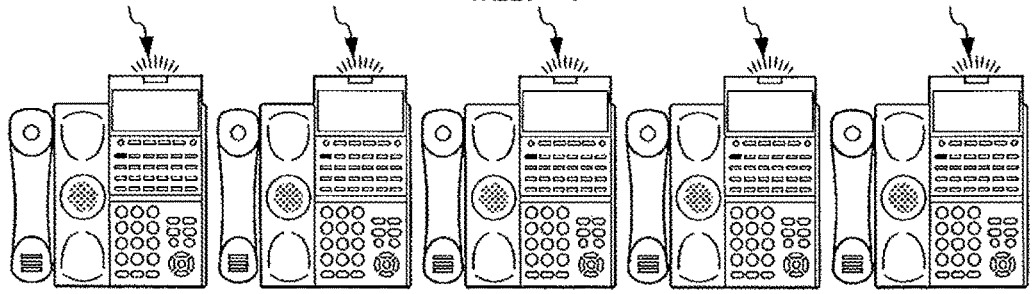

INCOMING-CALL NUMBER NOTIFICATION APPARATUS, EXCHANGE, INCOMING-CALL NUMBER NOTIFICATION SYSTEM, AND COMPUTER READABLE MEDIUM

CROSS REFERENCE TO RELATED APPLICATIONS

This application is a National Stage of International Application No. PCT/JP2017/021630 filed Jun. 12, 2017, claiming priority based on Japanese Patent Application No. 2016-142973 filed Jul. 21, 2016.

TECHNICAL FIELD

The present invention relates to an incoming-call number notification apparatus, an exchange, an incoming-call number notification system, and an incoming-call number notification program for performing a process related to a notification about the number of incoming calls.

BACKGROUND ART

It has been common to use a direct inward-dialing function in order to accommodate an outside line in an exchange and share this outside line among a plurality of extension terminals. In this case, an imaginary extension line is used so that a plurality of extension telephones can respond to an incoming call arriving at one dial-in number.

Specifically, an imaginary extension line is set as a destination of a dial-in incoming call. Then, this imaginary extension line is assigned to a function button of a plurality of extension telephones which are multi-function telephones. After that, when a dial-in incoming call occurs at this imaginary extension line, a plurality of extension telephones to which the imaginary extension line is assigned ring and imaginary extension buttons at the destinations corresponding to the imaginary extension line blink in red so as to notify that the dial-in incoming call has occurred. In this state, the user of the extension telephone can respond to the dial-in incoming call by pressing the blinking imaginary extension button.

Then, when a user of one of the plurality of extension telephones responds to the dial-in incoming call by pressing the imaginary extension button, the ringing in each of the extension telephones is stopped. Further, the light of the imaginary extension button of the extension telephone that has responded to the incoming call changes to green, thus indicating that the call is in progress. Meanwhile, the imaginary extension buttons of the other extension telephones are turned off.

In this state, when another dial-in incoming call occurs at the imaginary extension line, the extension telephones other than the one that has already responded to the dial-in incoming call ring. Further, the imaginary extension buttons blink in red so as to notify that the dial-in incoming call has occurred. A user of the extension telephone which in not in a busy state and whose imaginary extension button is blinking can respond to the dial-in incoming call by pressing the blinking imaginary extension button.

As described above, the imaginary extension line has such a mechanism that an extension telephone receives not only a call to a specific extension number of that extension telephone, but also an incoming call arriving through the imaginary extension line to which a plurality of extension telephones are assigned.

Because of this mechanism, even when all the extension telephones have responded to dial-in incoming calls and are all in a busy state, and there is no extension telephone that can respond to another incoming call, they still accept a new dial-in incoming call to the imaginary extension line.

In this case, since all the extension telephones are in the busy state, it is impossible to respond to the new dial-in incoming call.

Regarding this matter, Patent Literature 1 discloses a technique for preventing a dial-in incoming call that cannot be responded to as described above from occurring.

Specifically, in the technique disclosed in Patent Literature 1, the upper limit for the number of dial-in incoming calls is limited to the number of extension terminals. Then, when there is a dial-in incoming call by which the number of incoming calls exceeds the upper limit, it is indicated that the line is "busy" to that dial-in incoming call and the incoming call is not accepted. In this way, it is possible to prevent the situation in which a new dial-in incoming call is accepted even though there is no extension telephone that can respond to the incoming call at the moment, and hence it is impossible to respond to this dial-in incoming call.

CITATION LIST

Patent Literature

Patent Literature 1: Japanese Unexamined Patent Application Publication No. H07-023436
Patent Literature 2: Japanese Unexamined Patent Application Publication No. 2006-253905
Patent Literature 3: Japanese Unexamined Patent Application Publication No. 2009-177249

SUMMARY OF INVENTION

Technical Problem

As described above, by using the technique disclosed in Patent Literature 1, it is possible to prevent the situation in which although an incoming call is accepted, that incoming call cannot be responded to.

However, it is not necessarily desirable to limit the number of dial-in incoming calls to the number of extension terminals in every possible situation. For example, in customer contacts, call centers, and the like, responding to incoming calls from customers with busy states could lead to a loss of sales opportunities and deterioration in customer services. Therefore, even when the number of dial-in incoming calls exceeds the number of extension telephones, they do not intentionally respond to the incoming calls with busy states, but request the customers to wait a certain period of time. An incoming call by which the number of incoming calls exceeds the number of extension telephones and hence which is put into a waiting state as described above is called an "overflow call".

When there is an overflow call, all the extension telephones are busy states. Therefore, the imaginary extension buttons of all the extension telephones are lighted up in green. Therefore, even when a user such as an operator of an extension telephone looks at its imaginary extension button, he/she cannot recognize whether there is an overflow call at the present moment. Further, the extension telephones in busy states do not ring. Therefore, the user cannot recognize that a new incoming call has occurred at the imaginary extension line by the ringing sound.

However, when there is an overflow call, it is necessary to make users take some measures such as making an effort to finish the ongoing calls as soon as possible. Therefore, it is necessary to notify users that there is an overflow call by using some kind of method.

Regarding this matter, in customer contacts, call centers, and the like, they adopt, for example, a method in which users are notified that there is an overflow call by using equipment other than the extension telephones and the exchange.

Specifically, a PATLITE (Registered Trademark) is installed and it is lighted up when there is an overflow call. Alternatively, a display board is provided and, when there is an overflow call, it is displayed on the bulletin board. Alternatively, in customer contacts and call centers equipped with CTI (computer telephony integration), an overflow call situation is displayed on personal computers.

However, all of the above-described methods require special equipment other than the extension telephones and the exchange. Therefore, in simplified customer contacts and offices in which overflow calls occasionally occur, the above-described overflow-call notification method requiring special could not be adopted.

As a technique in which the above-described matter is taken into consideration, Patent Literature 2 discloses a technique in which a notification is made by using a liquid crystal display (LCD: liquid crystal display) of an extension telephone without requiring any special equipment. Specifically, in the technique disclosed in Patent Literature 2, when an overflow call occurs, the number of overflow calls is displayed on liquid-crystal displays of extension telephones and hence users are notified of the number of overflow calls.

However, it is difficult to read numbers displayed on the liquid-crystal display of the extension telephone from a place some distance away therefrom. Therefore, there are occasions in which a user cannot easily recognize the number of overflow calls.

In view of the above-described circumstances, it has been desired to provide a method in which a user is notified of the number of incoming calls at the present moment so that he/she can recognize whether or not there is an overflow call even from a place some distance away from the display without requiring any special equipment.

Therefore, an object of the present invention is to provide an incoming-call number notification apparatus, an exchange, an incoming-call number notification system, and an incoming-call number notification program capable of notifying a user of the number of incoming calls at the present moment with high viewability.

Solution to Problem

According to a first aspect, the present invention provides an incoming-call number notification apparatus including a control unit configured to: when there is an incoming call to a plurality of telephones accommodated in an exchange, determine a display color according to the number of incoming calls at the present moment; and instruct the plurality of telephones to blink or light up an incoming-call lamp of its own telephone in the determined display color.

According to a second aspect, the present invention provides an exchange accommodating a plurality of telephones, the exchange including: call control means for performing call control for the plurality of telephones accommodated in the own exchange; and an incoming-call number notification apparatus provided according to the above-described first aspect of the present invention, in which the control unit included in the incoming-call number notification apparatus operates for the plurality of telephones accommodated in the own exchange.

According to a third aspect, the present invention provides an incoming-call number notification system including: a plurality of telephones accommodated in an exchange; and an incoming-call number notification apparatus provided according to the above-described first aspect of the present invention, the incoming-call number notification apparatus being configured to operate for the plurality of telephones, in which each of the plurality of telephones blinks or lights up an incoming-call lamp of the own telephone in the determined display color in accordance with an instruction from the incoming-call number notification apparatus.

According to a fourth aspect, the present invention provides an incoming-call number notification program for causing a computer to function as an incoming-call number notification apparatus, the incoming-call number notification apparatus including a control unit configured to: when there is an incoming call to a plurality of telephones accommodated in an exchange, determine a display color according to the number of incoming calls at the present moment; and instruct the plurality of telephones to blink or light up an incoming-call lamp of its own telephone in the determined display color.

Advantageous Effects of Invention

According to the present invention, it is possible to notify a user of the number of incoming calls at the present moment with high viewability.

BRIEF DESCRIPTION OF DRAWINGS

FIG. 4 is a table showing a setting for destinations of dial-in incoming calls according to an embodiment of the present invention;

FIG. 6 is a diagram showing a setting for the number of simultaneous incoming calls including incoming calls that are currently dealt with and colors of an incoming-call lamp according to an embodiment of the present invention;

FIG. 7 is a diagram showing a response to a dial-in incoming call according to an embodiment of the present invention;

FIG. 8 is a diagram showing a state in which the number of overflow calls are displayed in such a manner that it can be specified based on the color of an incoming-call lamp according to an embodiment of the present invention;

DESCRIPTION OF EMBODIMENTS

Firstly, an outline of an embodiment according to the present invention is described. Roughly speaking, in an embodiment according to the present invention, a user is notified of the number of incoming calls that have already arrived at an imaginary extension line by a display color of an incoming-call lamp of an extension terminal by using a multi-color display function (e.g., a seven color display function) for the incoming-call lamp.

In this way, it is possible to notify a user not only whether or not a call that is in a calling state and in an response-waiting state (hereinafter called "a waiting call") has occurred, but also, when the number of incoming calls is greater than the number of extension telephones and hence an overflow call(s) has occurred, of the number of overflow calls.

Regarding this matter, in the related art, it is impossible to recognize whether or not there is a waiting call and figure out the number of overflow calls unless special hardware other than the telephones and the exchange is used. Further, in the related art, when special hardware other than the telephones and the exchange is not used, the information is displayed on a liquid-crystal display and hence its viewability is poor. Therefore, it is impossible to easily recognize whether or not there is a waiting call and the number of overflow calls from a place some distance away from the display.

As a result, there are cases in the related art in which callers are inconvenienced. In contrast, in this embodiment, it is possible to notify a user whether or not there is a waiting call and notify the user of the number of overflow calls by using an incoming-call lamp of a telephone without requiring special hardware other than the telephones and the exchange. Further, in addition, since a change in the color of the incoming-call lamp is highly visible even from a place some distance away therefrom, a user can easily figure out the number of incoming calls at the present moment.

As a result, this embodiment can provide improved services to callers. The outline of the embodiment according to the present invention has been described above.

Next, an embodiment according to the present invention is described in detail with reference to the drawings. Firstly, a dial-in service, which is a service in which telephone lines can be efficiently used according to this embodiment, is described.

Figure 1:
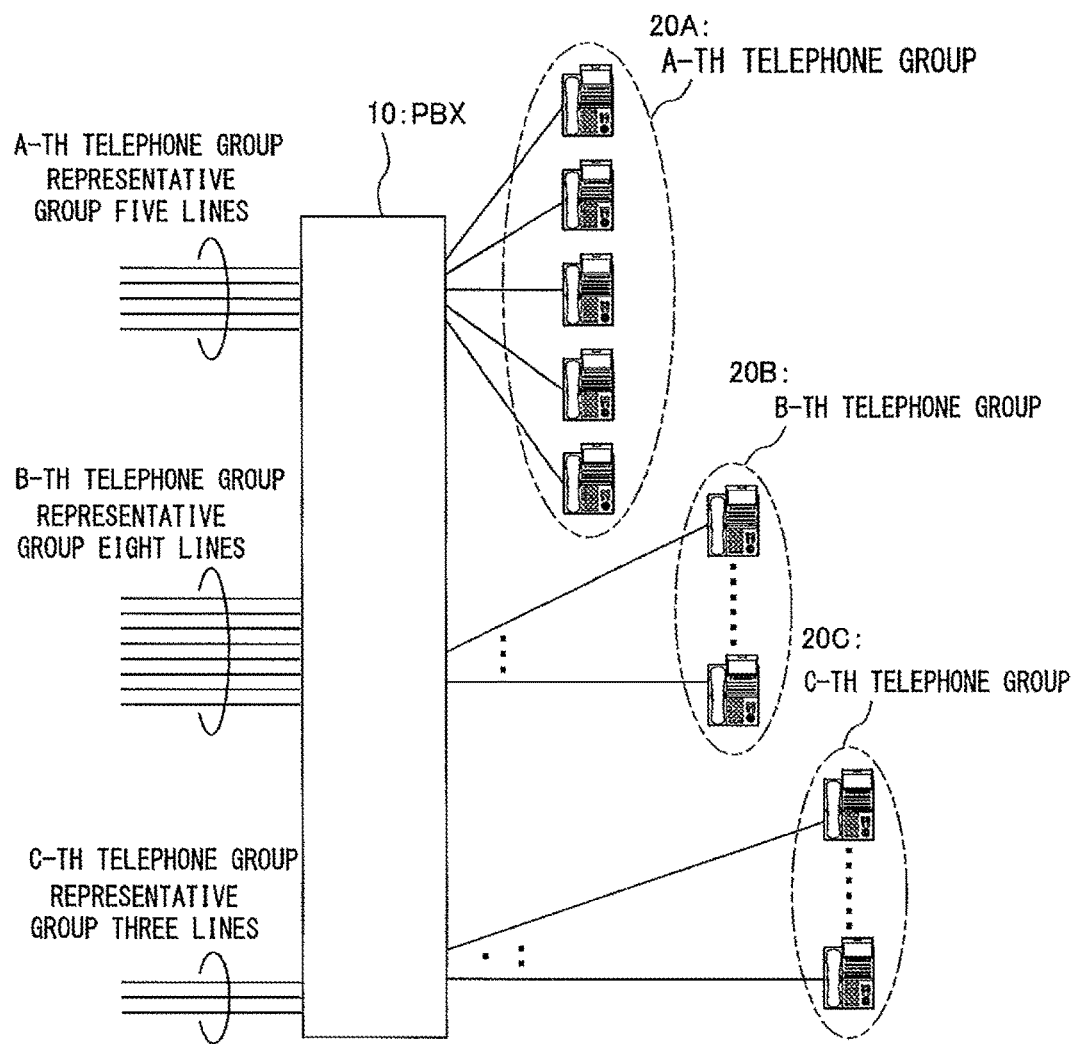
FIG. 1 is a diagram showing a system configuration when a representative group contract is made.

A hypothetical case in which ordinary lines are divided into representative groups and operated based on the representative groups without using a dial-in service as shown in FIG. 1 is described hereinafter. In this case, as shown in FIG. 1, five lines are assigned to an A-th telephone group 20A, which is a group of extension telephones accommodated in a PBX (Private Branch eXchange) 10, and eight lines are assigned to a B-th telephone group 20B. Further, three lines are assigned to a C-th telephone group 20C. Thus, a contract for 16 lines in total is necessary.

However, if an occasion in which there are a number of incoming calls corresponding to the maximum number of lines for each of the A-th, B-th, and C-th telephone groups 20A, 20B, and 20C does not occur, lines at which no incoming call arrives are wasted.

Figure 2:
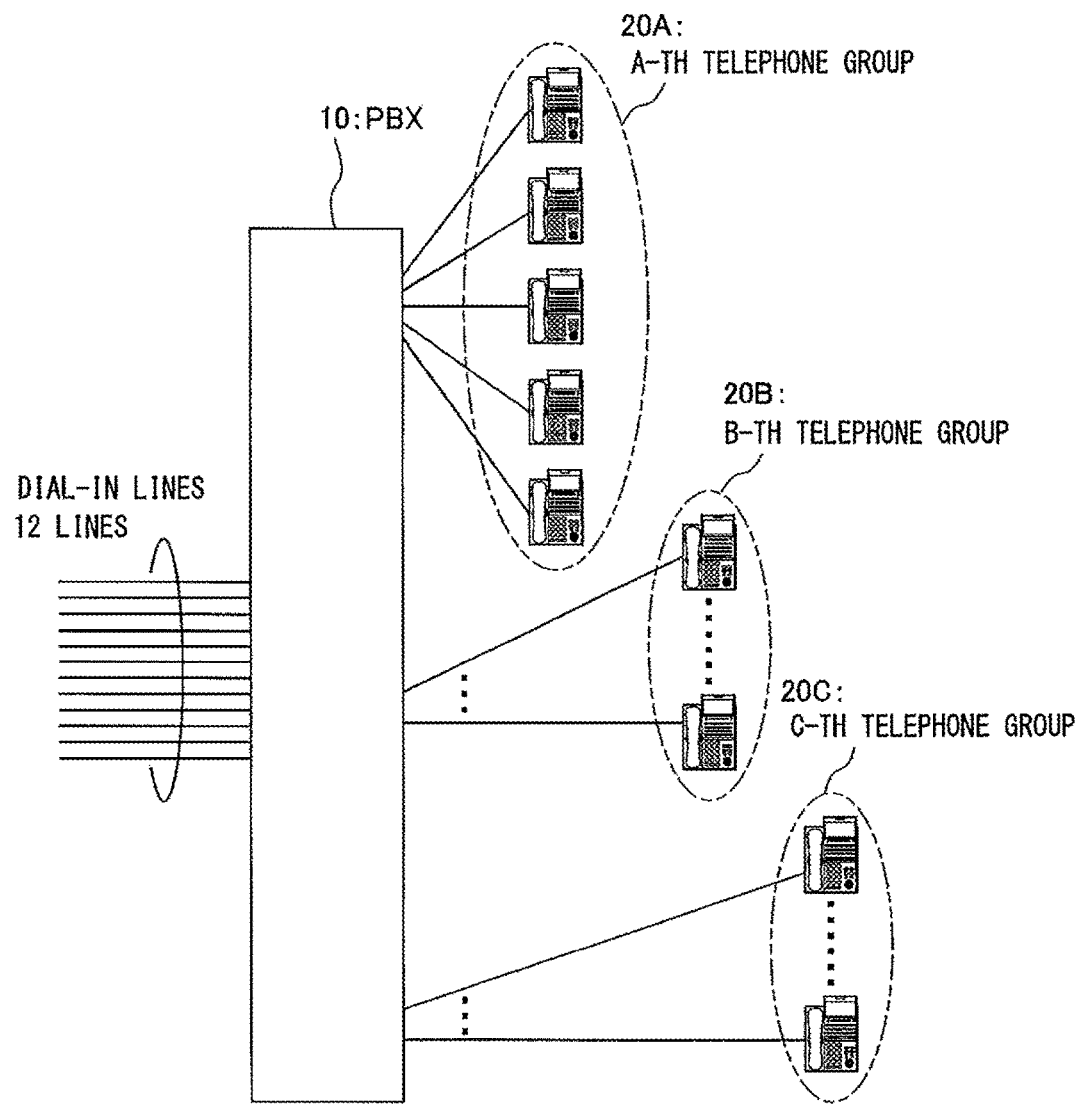
FIG. 2 is a diagram showing a system configuration when a dial-in contract is made.

In consideration of such a situation, it is possible to effectively use lines by having a contract for a dial-in service. For example, when a dial-in contract for 12 lines is made as shown in FIG. 2, it is possible to accept incoming calls as long as the total number of incoming calls in the A-th, B-th, and C-th telephone groups 20A, 20B, and 20C is equal to or less than 12. Therefore, it is possible to accept 12 incoming calls for each of the A-th, B-th, and C-th telephone groups 20A, 20B, and 20C at the maximum. In other words, by having a dial-in contract, it is possible to efficiently use a small number of contracted lines and increase the number of incoming calls that are in busy states.

Therefore, as shown in FIG. 2, this embodiment has a configuration in which dial-in lines are connected to the PBX 10 and a plurality of extension telephones 20 are accommodated in this PBX 10. This configuration and functional blocks included in the PBX 10 are described with reference to FIG. 3.

Figure 3:
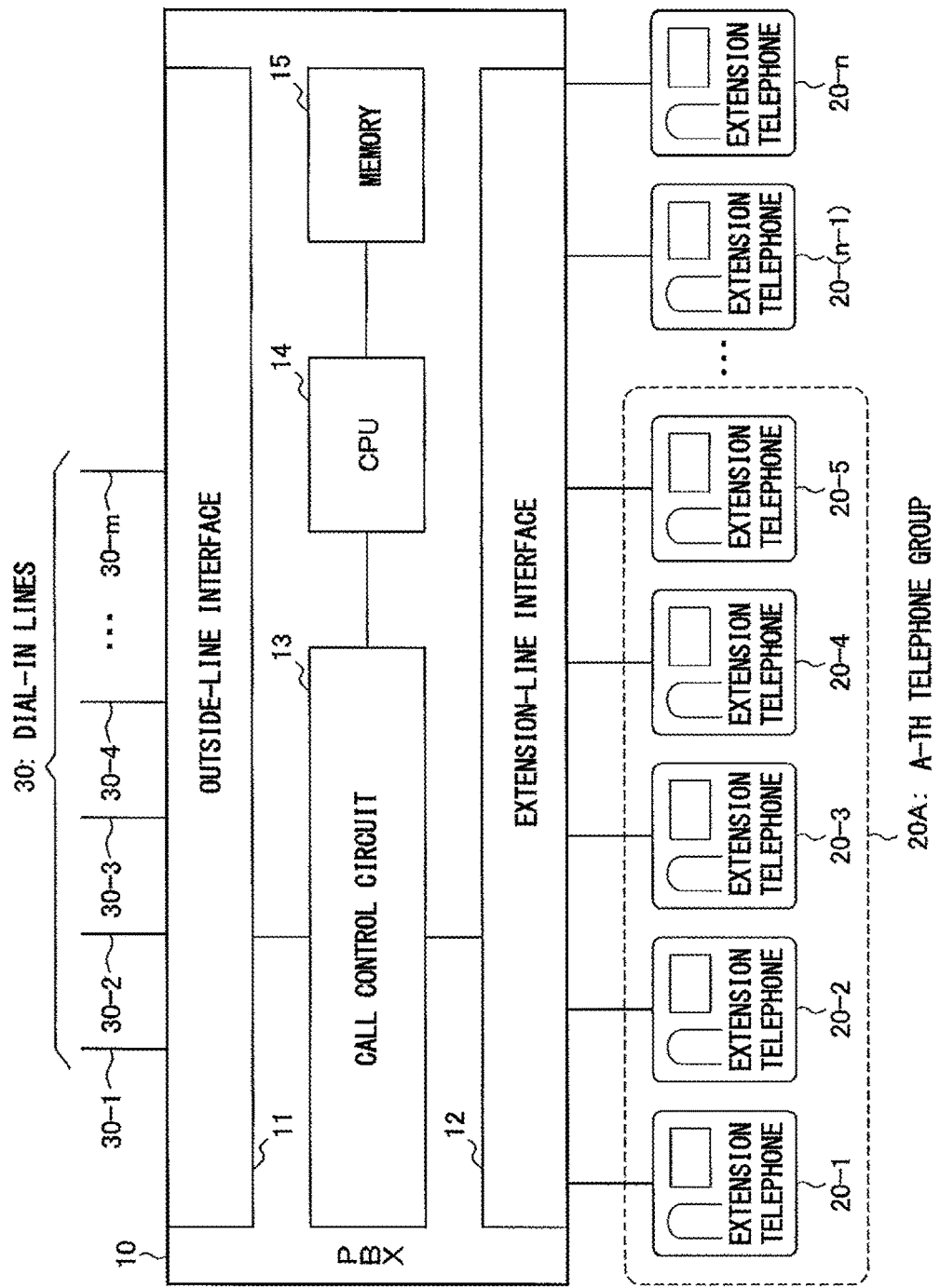
FIG. 3 is a block diagram showing a configuration of a PBX according to an embodiment of the present invention.

Referring to FIG. 3, this embodiment includes the PBX 10 and n extension telephones 20 accommodated in the PBX 10. Further, m dial-in lines 30 are connected to the PBX 10. Note that n and m are arbitrary natural numbers.

The PBX 10 includes an outside-line interface 11, an extension-line interface 12, a call control circuit 13, a CPU (Central Processing Unit) 14, and a memory 15. Note that the functional blocks included in the PBX 10 can be implemented by hardware included in an ordinary PBX. That is, in this embodiment, it is possible to implement a function of changing a display color of an incoming-call lamp without incorporating special hardware into the PBX.

Note that the outside-line interface 11 is an interface for connecting to the dial-in lines 30. Further, the extension-line interface 12 is an interface for accommodating the plurality of extension telephones 20 in the PBX. The call control circuit 13 is a circuit for carrying out a telephone call between extension lines, and a telephone call between the outside line and the extension line. Since configurations of these functional blocks are well known to those skilled in the art, detailed descriptions thereof are omitted.

The CPU 14 and the memory 15 function as a control unit for controlling the whole PBX 10. By the control performed by the CPU 14 and the memory 15, the PBX 10 carries out processes as an ordinary PBX. Further, the process for changing the display color of the incoming-call lamp, which is a process unique to this embodiment, is also carried out by the control performed by the CPU 14 and the memory 15.

More specifically, the memory 15 is implemented by using, for example, a ROM (Read Only Memory) or an HDD (Hard disk drive) that stores an OS (Operating System) and various control programs, and a RAM (Random Access Memory) or the like for temporarily storing data that is required by the CPU or the like when it executes a program.

Further, the CPU 14 loads the OS and various control programs from the ROM included in the memory 15 and performs arithmetic processing based on the OS and various control programs while unfolding the loaded OS and the control program in the RAM. Then, the CPU 14 controls the hardware in the PBX 10 based on the calculation result, so that various processes of the PBX 10 are carried out. That is, the PBX 10 can be implemented by the cooperation of hardware and software.

Further, in this embodiment, the PBX 10 sets the destinations of dial-in incoming calls to an imaginary extension line. By doing so, it is possible to make a larger number of dial-in incoming calls than the number of telephones included in the extension-telephone group at the destination wait in a response-waiting state while remaining in a calling state.

More specifically, destinations are defined as shown in FIG. 4. For example, referring to No. 1 in FIG. 4, it can be understood that when a receiving number of a dial-in incoming call is "AAAA" (e.g., when there is an incoming call at a number 03-1234-AAAA), its destination is set to an "A-th imaginary extension line". Further, it can be understood that each of the extension telephones included in the "A-th telephone group 20A" is associated with the A-th imaginary extension line.

In this case, the A-th imaginary extension line is assigned to function keys of the five extension telephones, i.e., extension telephones 20-1 to 20-5 (see FIG. 3) included in the A-th telephone group 20A. Then, when there is a dial-in incoming call at the receiving number "AAAA" corresponding to the A-th imaginary extension line, the five extension telephones, i.e., the extension telephones 20-1 to 20-5 (see FIG. 3), for which the imaginary extension line at the destination of the dial-in incoming call is assigned to their function buttons, blink their imaginary extension buttons assigned to the function keys in red and ring according to an instruction from the PBX 10. A user of any one of the extension telephones 20-1 to 20-5 can respond to the dial-in incoming call by pressing the blinking imaginary extension button.

Note that each of the n extension telephones 20 is a multi-function telephone including a function key that functions as an imaginary extension button and an incoming-call lamp that can blink or light up in a plurality of display colors. The n extension telephones 20 are divided into groups by the PBX 10 and function as extension telephones. A user interface for the extension telephones 20 is described with reference to FIG. 5.

Figure 5:
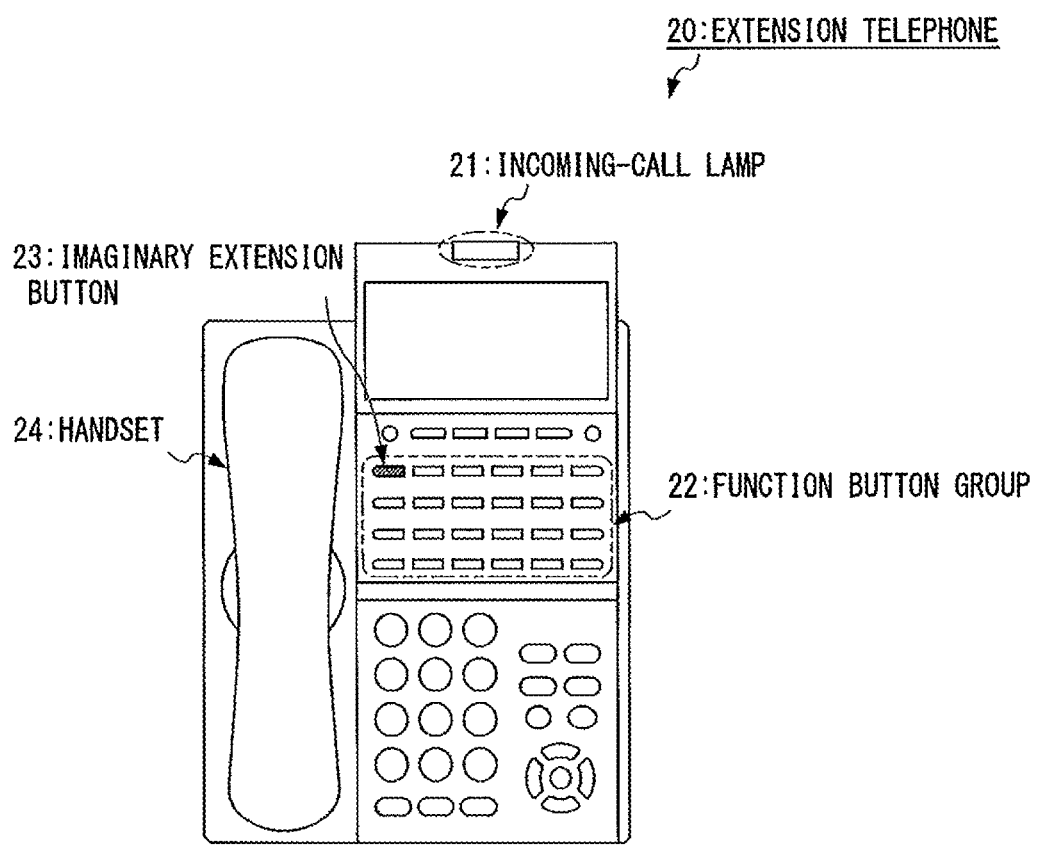
FIG. 5 is a diagram showing an assignment of an imaginary extension button according to an embodiment of the present invention.

As shown in FIG. 5, each extension telephone 20 includes an incoming-call lamp 21, a group of function buttons 22, and a handset 24. Further, one button in the function button group 22 is set as an imaginary extension button 23 by the PBX 10.

The incoming-call lamp 21 is an incoming-call lamp that can blink or light up in a plurality of display colors and can display seven colors as the display colors. That is, the incoming-call lamp can blink or light up in a color selected from the seven colors. In this embodiment, it is possible to notify a user not only whether or not there is a waiting call by blinking of the incoming-call lamp 21, but also whether or not there is an overflow call(s) and, when there is an overflow call(s), of the number of overflow calls by changing the display color. Note that details of a specific notification method involving switching of a display color performed by the incoming-call lamp 21 will be described later with reference to FIG. 7 and subsequent Figures.

The function button group 22 is a group of a plurality of function keys to each of which the PBX 10 can assign a predetermined function. In this embodiment, in particular, a function as the imaginary extension button 23 corresponding to one of the imaginary extension lines is assigned.

For example, when a setting is made as shown in FIG. 4, a function as the imaginary extension button 23 corresponding to the A-th imaginary extension line is assigned to a function key included in the function button group 22 of each of the five extension telephones, i.e., the extension telephones 20-1 to 20-5. Note that since there are a plurality of function keys in the function button group 22, it is also possible to assign a function as an imaginary extension button 23 corresponding to a different imaginary extension line to each of the plurality of function keys. However, in this case, it is unclear which imaginary extension line the display color of the incoming-call lamp 21 is associated with. Therefore, in the following description, one extension telephone 20 is assigned to only one imaginary extension line as shown in FIG. 4.

The handset 24 is an ordinary handset. In a state where a dial-in incoming call has arrived at the extension telephone 20, as a user picks up the handset 24, the incoming call is responded to. Therefore, a telephone call is started. Further, after the telephone call is started, when the user returns the handset 24 to the extension telephone, the telephone call is finished.

Next, a setting for display colors of the incoming-call lamp 21, which blinks when an imaginary extension line arrives at the imaginary extension line, is described with reference to FIG. 6. Here, an example case where five extension telephones, i.e., extension telephones 20-1 to 20-5 are included a telephone group as described above with reference to FIG. 4 is described. Accordingly, FIG. 6 shows a setting for display colors of the incoming-call lamp 21 in the case where five extension telephones are included in a telephone group.

In this embodiment, when an incoming call arrives at an imaginary extension line, a user is not only notified whether or not there is a waiting call by blinking the incoming-call lamp 21, but also of the number of incoming calls at the present moment by switching the display color in which the incoming-call lamp 21 blinks.

For example, when the number of incoming calls (which corresponds to a total number obtained by adding the number of "waiting calls", i.e., calls that are in calling state and in response-waiting states and the number of "ongoing calls", i.e., calls that have already been responded and are in progress) is equal to or less than the number of the extension telephones 20 included in the telephone group, i.e., is between one and five, the incoming-call lamp 21 blinks in white.

Next, when the number of incoming calls is further increased and becomes six, the display color of the incoming-call lamp 21 is changed to yellowish green.

After that, as the number of incoming calls is increased, the display color changes as shown in FIG. 6. Specifically, when the number of incoming calls is seven, the display color in which the incoming-call lamp 21 blinks becomes blue. When the number of incoming calls is eight, the display color in which the incoming-call lamp 21 blinks becomes indigo. When the number of incoming calls is nine, the display color in which the incoming-call lamp 21 blinks becomes yellow. When the number of incoming calls is ten, the display color in which the incoming-call lamp 21 blinks becomes pink. Further, when the number of incoming calls is 11 or greater, the display color in which the incoming-call lamp 21 blinks becomes red.

A user who refers to the blinking of the incoming-call lamp 21 in one of these display colors can recognize that there are a waiting call(s) based on the blinking. Further, by informing a user of display colors and the numbers of incoming calls corresponding to these colors in advance, the user can figure out the number of incoming calls based on the display color. Further, in addition, by informing the user of the number of extension telephones 20 that are assigned to the imaginary extension line in advance, the user can figure out the number of overflow calls by subtracting the number of the extension telephones 20 assigned to the imaginary extension line from the number of the incoming calls.

For example, when the display color is white, the number of incoming calls is equal to or less than the number of extension telephones. Therefore, the user can figure out that no overflow call is occurring.

Further, for example, when the display color is yellowish green, the number of incoming calls is greater than the number of extension telephones by one. Therefore, the user can figure out that an overflow call is occurring and the number of overflow calls is one. Therefore, the user can recognize that he/she needs to take some measures such as making an effort to finish the ongoing call as soon as possible.

Further, when the display color changes as follows: blue→indigo→yellow→pink→read, the user can recognize that the number of overflow calls is increasing. Therefore, the user can recognize that the need for taking measures such as making an effort to finish the ongoing call as soon as possible is increasing even further.

As described above, in this embodiment, by instructions from PBX 10 and the incoming-call lamps 21 provided in the extension telephones 20, it is possible to notify a user not only whether or not a waiting call has occurred, but also, when the number of incoming calls, which is the sum total of the number of waiting calls and the number of ongoing calls, is greater than the number of extension telephones and hence an overflow call is occurring, of the number of overflow calls. That is, it is possible to notify a user without requiring special hardware other than the telephones and the exchange. Further, in addition, since the color change of the incoming-call lamp 21 can be easily visually-recognized even from a place some distance away therefrom, the user can easily recognize the number of incoming calls at the present moment.

Next, an operation for notifying a user that is performed by the extension telephone 20 when a dial-in call has arrived is described with reference to FIGS. 7 and 8. Note that this notification operation is performed based on instructions that are issued from the PBX 10 to the extension telephone 20.

Firstly, FIG. 7 shows that there is one dial-in incoming call and a notification operation that is performed by the extension telephone 20 to respond to this call. Note that in the following description, an example in which there is an incoming call at the A-th imaginary extension line and five extension telephones 20, i.e., extension telephones 20-1 to 20-5 corresponding to this A-th imaginary extension line perform notification operations is described.

When there is one dial-in incoming call at the A-th imaginary extension line, each of the extension telephones 20-1 to 20-5 at the destination of the dial-in incoming call to which the imaginary extension line buttons 23 are assigned rings. In addition, the incoming-call lamp 21 and the imaginary extension button 23 of each of the extension telephones 20-1 to 20-5 blink (see an upper part in FIG. 7). Note that since the number of incoming calls at the present moment is "1", the display color is white as shown in FIG. 6. Therefore the incoming-call lamp 21 blinks in a white display color. Meanwhile, the imaginary extension button 23 blinks in red.

Note that in FIGS. 7 and 8, illustration of explanatory lines for some of the extension telephones 20 is omitted for the sake of convenience. For example, in the upper part of FIG. 7, all the incoming-call lamps 21 are blinking. However, an explanatory line, which extends from a note "INCOMING-CALL LAMP IS BLINKING", is added only for the leftmost extension telephone 20 and explanatory lines for other extension telephones 20 are omitted. Further, in FIGS. 7 and 8, symbols "extension telephone 20-1" to "extension telephone 20-5" are omitted for the sake of convenience.

When a user responds to the dial-in incoming call, he/she can respond to it by pressing the blinking imaginary extension button 23 and picks up the handset 24 (off-hook). When any one of the extension telephones 20-1 to 20-5 responds to the dial-in incoming call, the ringing of the extension telephones 20 is stopped. Further, the incoming-call lamps 21 stop blinking and are turned off. Further, the imaginary extension buttons 23 of the extension telephones 20 other than the one that has responded to the call are also turned off. The imaginary extension button 23 of the extension telephone 20 that has responded to the call is lighted up in green, indicating that it is in a busy state. The figure shows a case where the extension telephone 20 located in the middle of the five extension telephones has responded to the call (see a middle part in FIG. 7).

Next, when a new dial-in incoming call occurs while the one of the extension telephones 20 is dealing with the dial-in incoming call (in a busy state), the four extension telephones 20 other than the one dealing with the call ring. Further their incoming-call lamps 21 blink and the imaginary extension buttons 23 also blink in red. Meanwhile, the extension telephone 20 that is dealing with the call does not ring. Further, its incoming-call lamp 21 remains in the green-lighted state and only the incoming-call lamp 21 blinks (see a lower part in FIG. 7). Note that since the number of incoming call at the present moment is "1", the display color is white as shown in FIG. 6. Therefore the incoming-call lamp 21 blinks in a white display color.

Next, a notification operation that is performed by each of the extension telephones 20 in the following state is described with reference to FIG. 8. That is, the state is as follows: the number of dial-in incoming calls increases after the above-described state, and a new dial-in incoming call further occurs in a state where all the extension telephones 20 in the extension-telephone group are dealing with dial-in incoming calls.

When all of the extension telephones 20 in the extension-telephone group are dealing with dial-in incoming calls, the imaginary extension buttons 23 of all the extension telephones 20 are in lighted states (see an upper part in FIG. 8). In this case, even when another dial-in call arrives, each of the extension telephones 20 does not rings and its imaginary extension button 23 remains in the lighted state because they are all in busy states. Therefore, only the incoming-call lamp 21 notifies a user of the dial-in incoming call.

Further, a caller of the dial-in incoming call is made to wait in a calling state until one of the extension telephones 20 finishes the call and becomes ready for responding to the incoming call. That is, an overflow call occurs. In this case, as described above with reference to FIG. 6, the number of incoming calls and the number of overflow calls are indicated by the display color of the incoming-call lamp 21 so that users of the extension telephones 20, which are dealing with other incoming calls and hence in busy states, can figure out how many callers (how many incoming calls) are waiting.

Specifically, when the number of incoming calls is six, the display color of the incoming-call lamp 21 is changed to yellowish green and the incoming-call lamp 21 is made to blink (see a middle part in FIG. 8). Then, as described above with reference to FIG. 6, as the number of incoming calls increases, the display color is changed as follows: blue→indigo→yellow→pink→read. Further, as the number of incoming calls decreases, the display color is changed as follows: read→pink→yellow→indigo→blue (see a lower part in FIG. 8).

In this way, it is possible to let users, who are dealing with other incoming calls, recognize the number of overflow calls. Therefore, when the number of waiting calls increases, users of extension telephones 20 that are dealing with other incoming calls can, for example, make efforts to finish the ongoing calls as soon as possible, or tell the callers that they will call back and finish the calls, so that they can respond to overflow calls as soon as possible.

Processes for carrying out the above-described series of notification operations are described with reference to FIGS. 9A to 9D. Note that the processes shown in FIG. 9A to 9D are entirely carried out by processes performed by the PBX 10 and instructions that are issued from the PBX 10 to the extension telephones 20.

Note that in the following description, the whole process is divided into four sub-processes. Further, FIGS. 9A and 9D correspond to the divided four processes, respectively. Specifically, FIG. 9A corresponds to a process for monitoring a dial-in incoming call. Further, FIG. 9B corresponds to a process for determining the color of the incoming-call lamp and the ringing. Further, FIG. 9C corresponds to a process for monitoring the end of a call. Further, FIG. 9D corresponds to a process for monitoring a response.

Further, in each of the processes described below, the number of "waiting calls", i.e., calls that has not yet been responded to (i.e., calls in calling states) is represented by a variable "A". Further, the number of "ongoing calls", i.e., incoming calls that have already been responded to and hence are in progress is represented by a variable "B". In this case, a value obtained by adding the values of B and A indicates the number of incoming calls.

Figure 9A:
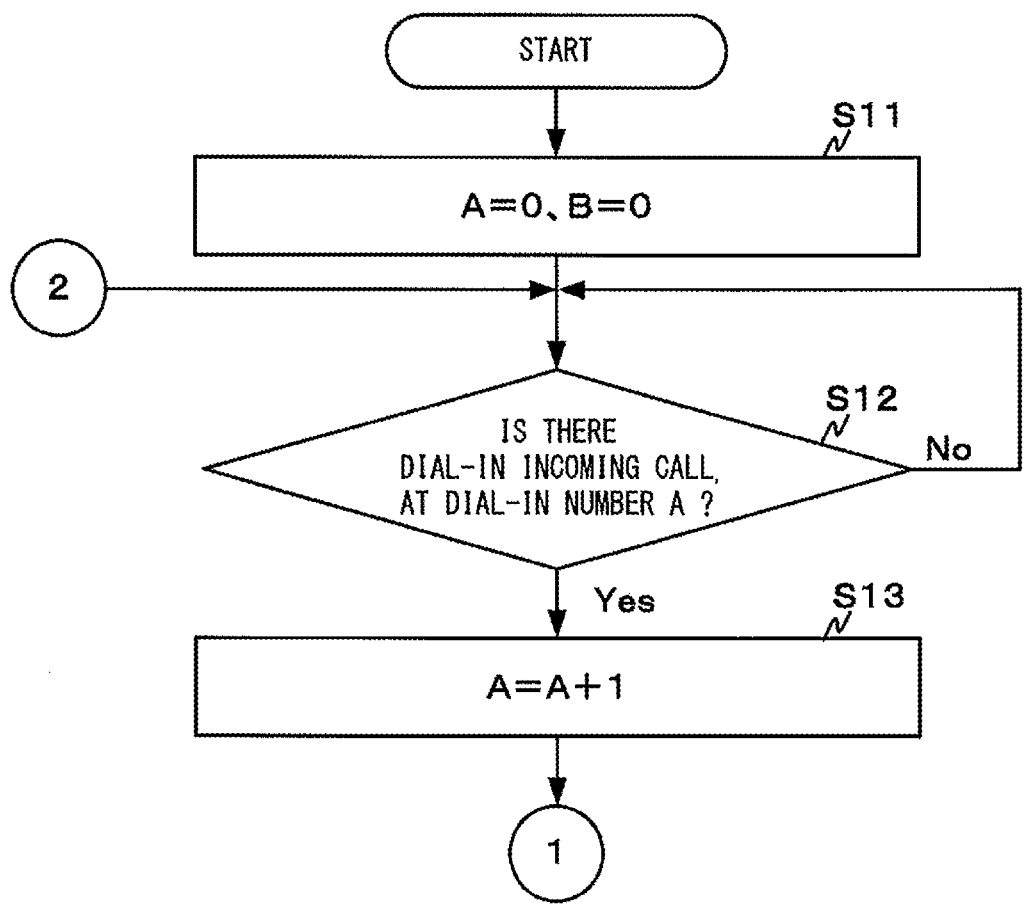
FIG. 9A is a flowchart (1/4) showing a basic operation according to an embodiment of the present invention.

Firstly, the process for monitoring a dial-in incoming call shown in FIG. 9A is started. Firstly, the variables A and B are set as "A=0 and B=0" (step S11). That is, the values of A and B are both set to zero. This indicates that the numbers of waiting calls and the number of ongoing calls are both zero.

Next, it is determined whether or not there is a dial-in incoming call at a number "AAAA", which is a receiving number corresponding to the A-th imaginary extension line, i.e., the imaginary extension line of interest in this process (step S12). When there is no dial-in incoming call, no particular process is performed and the determination is repeated (No at step S12).

On the other hand, when there is a dial-in incoming call (Yes at step S12), the variable A is set as "A=A+1" (step S13). That is, the value of A is increased by one.

Figure 9B:
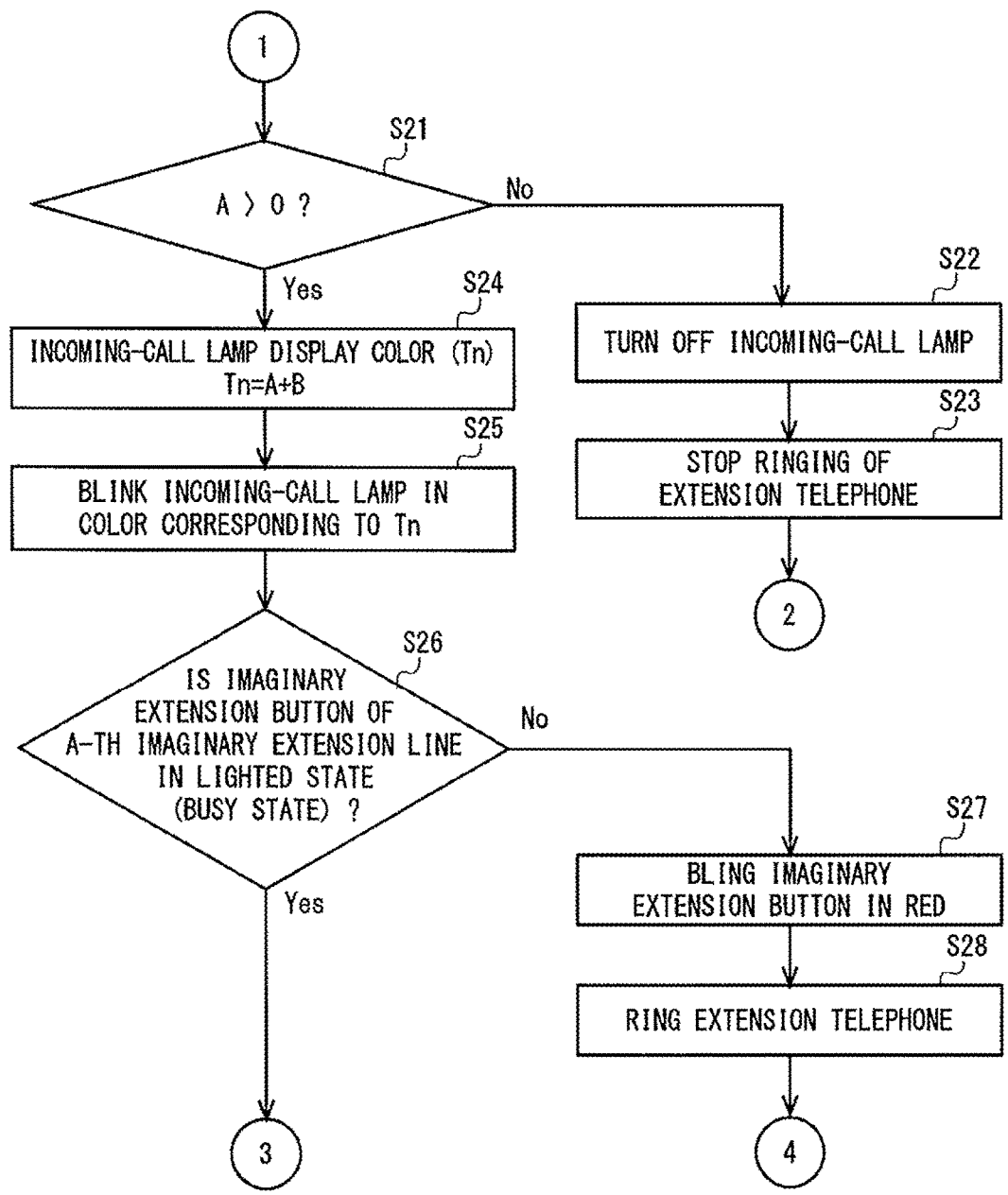
FIG. 9B is a flowchart (2/4) showing the basic operation according to the embodiment of the present invention.

Then, the process proceeds to a step S21 in FIG. 9B and the process for determining the color of the incoming-call lamp and the ringing is started. In this case, firstly, it is checked whether there is a waiting call. Therefore, it is determined whether or not a relation "A>0" holds (step S21).

When the relation "A>0" does not hold (No at step S21), there is no waiting call. Therefore, the incoming-call lamps 21 of the extension telephones 20 are tuned off (step S22) and the ringing of the extension telephones 20 is stopped (step S23). Then, the process proceeds to a step S12 in FIG. 9A and the process for monitoring a dial-in incoming call is performed.

On the other hand, when the relation "A>0" holds (Yes at step S21), there is a waiting call. Therefore, a value of "Tn", which is a variable for determining the display color of the incoming-call lamp 21, is calculated.

Note that as described above with reference to FIG. 6, the display color of the incoming-call lamp 21 is determined according to the number of incoming calls at the present moment. Further, as described above, the value obtained by adding the values of A and B is the number of incoming calls at the present moment. Therefore, the value of Tn is calculated as "Tn=A+B" (step S24).

Then, the incoming-call lamp 21 is made to blink in the display color corresponding to the value of the calculated Tn (step S25). In this case, the incoming-call lamp 21 is already blinking. Therefore, when the number of overflow calls changes, the color of the incoming-call lamp 21 is changed. A user, who has visually-recognized this color change, can easily recognize that the number of overflow calls has changed.

Next, it is determined whether or not the imaginary extension buttons 23 of the extension telephones 20 corresponding to the A-th imaginary extension line are in lighted states (i.e., whether or not the extension telephones 20 are in busy states) (Step S26).

For the extension telephones 20 that are in busy states (Yes at step S26), their imaginary extension buttons 23 are unchanged and made to continue the green-lighting states, which correspond to the display of the busy states.

Meanwhile, for the extension telephones 20 that are not in busy states (No at step S26), their imaginary extension buttons 23 are made to blink in red (step S27) and the extension telephones 20 are made to ring (step S28).

Figure 9C:
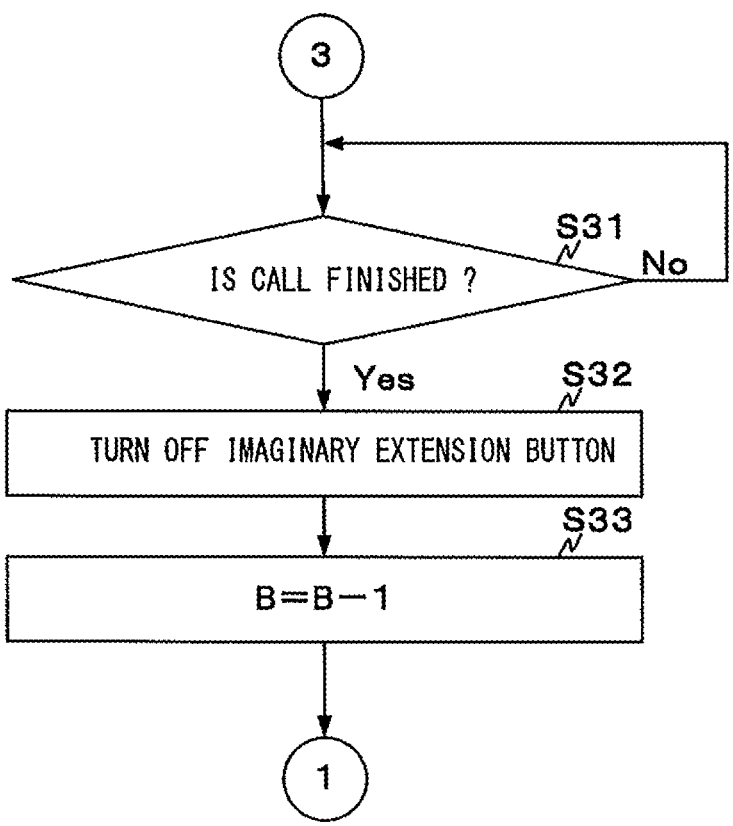
FIG. 9C is a flowchart (3/4) showing the basic operation according to the embodiment of the present invention.

Then, the extension telephones 20 in the busy state proceed to a step S31 in FIG. 9C in order to perform a process for monitoring the end of the call. Meanwhile, the extension telephones 20 in the calling state proceed to a step S41 in FIG. 9D in order to perform a process for monitoring the response.

Next, the process for monitoring the end of a call is described with reference to FIG. 9C. This process is a process performed for extension telephones 20 in busy states.

Firstly, an end of a call in the extension telephone 20 in a busy state is monitored (step S31). When the call continues and is not finished, no particular process is performed and the determination is repeated (No at step S31).

On the other hand, when on-hook of the extension telephone 20 in the busy state or on-hook of a telephone at the other end, i.e., a telephone of the caller is detected, it is determined that the call has been finished (Yes at step S31).

Then, the imaginary extension button 23 of the extension telephone 20 is turned off (step S32). Further, since the number of ongoing calls is decreased by one because of the end of the call, the variable B is set as "B=B−1" (step S33). That is, the value of B is decreased by one. Then, the process proceeds to a step S21 in FIG. 9B in order to perform the process for determining the color of the incoming-call lamp and the ringing. Next, the process for monitoring a response is described with reference to FIG. 9D. This process is a process performed for extension telephones 20 in calling states.

Firstly, the imaginary extension button 23 blinks in red and a response by the extension telephone 20 that is ringing and is in a calling state is monitored. At the same time, abandonment of the call by the caller is also monitored (step S41, step S42, No at step S41, and No at step S42).

Note that when the extension telephone 20 in the calling state responds to the call (Yes at step S41), the imaginary extension button 23 is lighted up in green (step S44).

Further, since the number of waiting calls is decreased by one because of the response, the variable A is set as "A=A−1". That is, the value of A is decreased by one. Further, since the number of ongoing calls is decreased by one because of the response, the variable B is set as "B=B+1". That is, the value of B is increased by one (Step S45). Then, upon responding to the call, the extension telephone 20 in the calling state becomes a busy state.

Therefore, it proceeds to a step S31 in FIG. 9C in order to perform the process for monitoring the end of a call.

On the other hand, when the caller abandons the call by returning the handset (Yes at step S42), the number of waiting calls is decreased by one and hence the value A is set as "A=A−1". That is, the value of A is decreased by one. Then, the process proceeds to a step S21 in FIG. 9B in order to perform the process for determining the color of the incoming-call lamp and the ringing.

Figure 9D:
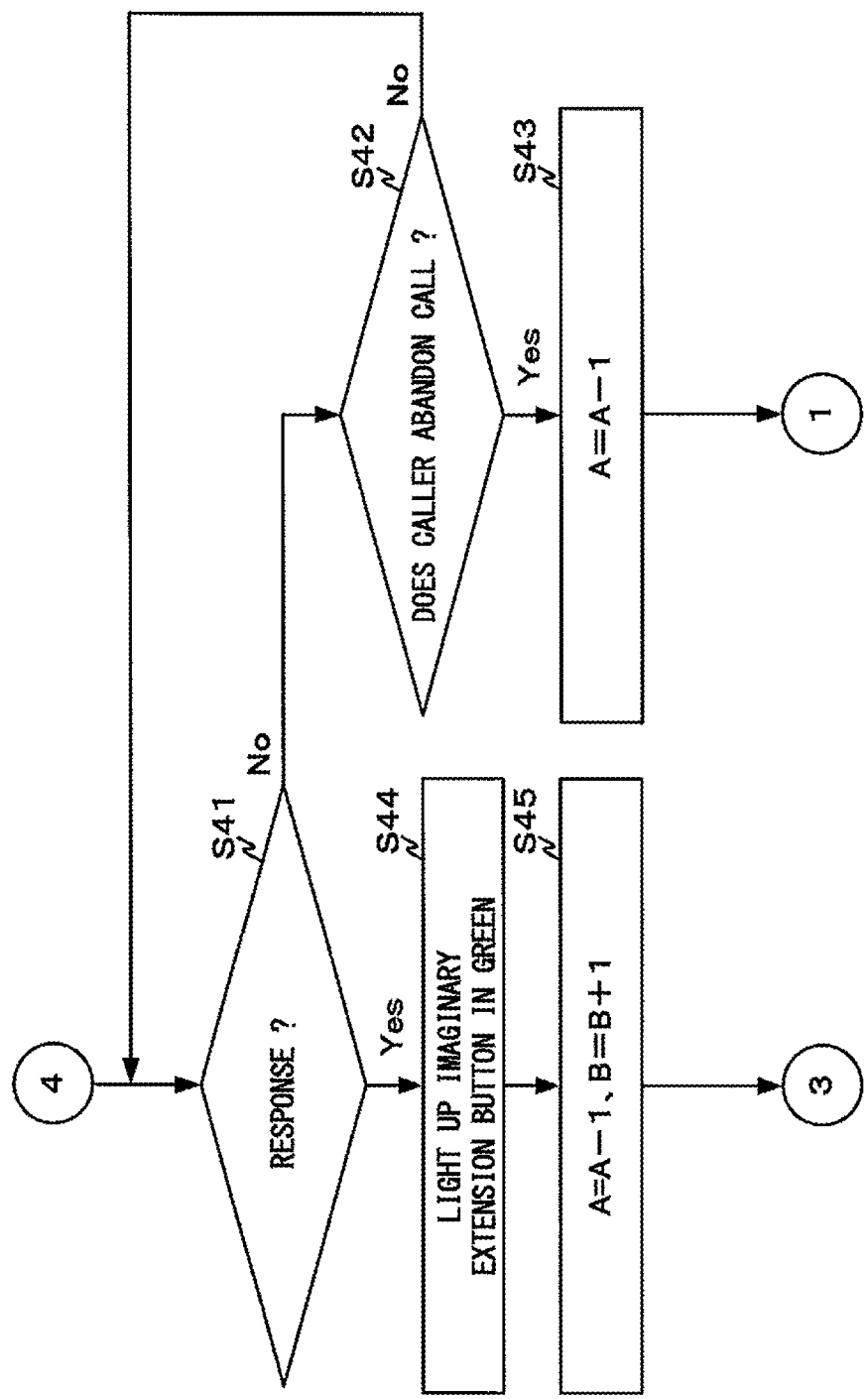
FIG. 9D is a flowchart (4/4) showing the basic operation according to the embodiment of the present invention.

Note that the processes in FIGS. 9C and 9D are performed for the respective extension telephones 20 in parallel to each other. Further, it is monitored whether or not there is a dial-in incoming call at a dial-in number A. Then, when there is a dial-in incoming call, the number of waiting calls is increased by one and hence the value A is set as "A=A+1". That is, the value of A is increased by one. Then, the process for determining the color of the incoming-call lamp and the ringing, which starts from the step S21 in FIG. 9B, is performed. By doing so, it is possible to change the color of the incoming-call lamp when there is another dial-in incoming call while the processes for monitoring the call end and monitoring the response in FIGS. 9C and 9D are being performed. In this way, the series of notification processes described above with reference to FIGS. 6 to 8 are carried out through the operations described above with reference to FIGS. 9A to 9D.

Modified Example

The above-described embodiments are preferred embodiments according to the present invention. However, the embodiments are not intended to limit the scope of the present invention to them. That is, various modifications can be made to the above-described embodiments and the present invention can be implemented in the form of those various embodiments without departing from the spirit of the present invention.

1. As a first modified example, it is conceivable to use the above-described embodiment in a facility using an ACD (Automatic Call Distribution) function (e.g., a call center or the like).

In a call center in which calls are received by using the ACD function, instead of using the dial-in lines, incoming calls arrive at individual extension lines in an orderly manner.

More specifically, in a call center in which calls are received by using the ACD function, incoming calls are made to arrive at telephones included in a group that should respond to the incoming calls in an orderly manner in accordance with a setting of the ACD. In this case, when the number of incoming calls is increased and all the extension telephones in the group at the destination become busy states, incoming calls become overflow calls as in the case of the above-described dial-in incoming calls. Therefore, a user may be notified of the presence of overflow calls and the number of existing overflow calls by an incoming-call lamp 21 according to a method similar to that in the above-described embodiment. In this way, it is possible to use the above-described embodiment in the facility using the ACD function.

2. As a second modified example, in the case of dial-in incoming calls, it is conceivable to limit the number of overflow calls.

In the case of dial-in incoming calls, the maximum number of overflow calls may be limited by using, for example, a technique disclosed in Patent Literature 3. For example, when the number of extension telephones assigned to an imaginary extension line is five, the maximum number of incoming calls that can be responded to is limited to 11.

In this way, it is possible to limit the maximum number of overflow calls to six. Then, similarly to the above-described embodiment, as the number of overflow calls increases, the display color of the incoming-call lamp 21 is changed. However, when the number of incoming calls reaches 11, the display color of the incoming-call lamp 21 is changed to red. Further, when incoming calls further arrive, it is indicated that the line is "busy" to these incoming calls. Further, instead of indicating the busy state, an announcement such as "Would you please call later" may be given after an automatic response by using an automatic response function of the PBX and then the call is disconnected. Further, after the disconnection, a call may be made to the caller by using an automatic call-back function.

By doing so, it is possible to, when the number of overflow calls becomes too large, prevent users on the calling sides from waiting an unnecessary long time by limiting the occurrences of overflow calls after that.

3. Other Modified Example

In the above-described embodiments, the imaginary extension button 23 is made to blink in the display color that is determined as the variable Tn. For this mater, the imaginary extension button 23 may be lighted up in a display color determined as Tn, instead of making the imaginary extension button 23 blink in the display color determined as Tn.

Note that each of the above-described PBX 10 and the extension telephones 20 can be implemented by hardware, software, or a combination thereof. Further, the incoming number notification method performed by the above-described PBX 10 and the extension telephone 20 can also be implemented by hardware, software, or a combination thereof. Note that "being implemented by software" means being implemented by having a computer load and execute a program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, the whole or part of the embodiments disclosed above can be described as, but not limited to, the following supplementary notes.

(Supplementary note 1) An incoming-call number notification apparatus comprising a control unit configured to:

when there is an incoming call to a plurality of telephones accommodated in an exchange, determine a display color according to the number of incoming calls at the present moment; and instruct the plurality of telephones to blink or light up an incoming-call lamp of its own telephone in the determined display color.

(Supplementary note 2) The incoming-call number notification apparatus described in Supplementary note 1, wherein the control unit determines the display color so the display color that is used when the number of incoming calls at the present moment is equal to or less than the number of the plurality of telephones differs from the display color that is used when the number of incoming calls at the present moment is greater than the number of the plurality of telephones.

(Supplementary note 3) The incoming-call number notification apparatus described in Supplementary note 1 or 2, wherein when the number of incoming calls at the present moment is greater than the number of the plurality of telephones, the control unit determines the display color so that the display color is changed as a difference between the number of incoming calls and the number of the plurality of telephones increases.

(Supplementary note 4) The incoming-call number notification apparatus described in any one of Supplementary notes 1 to 3, wherein the control unit instructs a telephone that is dealing with one of the incoming calls to blink or light up an incoming-call lamp of its own telephone in the determined display color.

(Supplementary note 5) The incoming-call number notification apparatus described in any one of Supplementary notes 1 to 4, wherein when the number of display colors that the incoming-call lamps of the plurality of telephones can emit is n (n is a natural number no less than four), the control unit determines that a first color is used as the display color when the number of incoming calls at the present moment is equal to or less than the number of the plurality of telephones, the control unit determines that a different color, such as a second color, a third color, and so on, is used as the display color every time a difference between the number of incoming calls at the present moment and the number of the plurality of telephones is increased by one, and the control unit determines that an n-th color is used as the display color when the number of incoming calls reaches or exceeds a number corresponding to the n-th color.

(Supplementary note 6) The incoming-call number notification apparatus described in any one of Supplementary notes 1 to 5, wherein the control unit operates for a plurality of telephones assigned to one imaginary extension line.

(Supplementary note 7) The incoming-call number notification apparatus described in any one of Supplementary notes 1 to 5, wherein the control unit operates for a plurality of telephones that are included in telephones that respond to an incoming call by using an ACD (Automatic Call Distribution) function.

(Supplementary note 8) An exchange accommodating a plurality of telephones, the exchange comprising:
call control means for performing call control for the plurality of telephones accommodated in the own exchange; and
an incoming-call number notification apparatus described in any one of Supplementary notes 1 to 7, wherein
the control unit included in the incoming-call number notification apparatus operates for the plurality of telephones accommodated in the own exchange.

(Supplementary note 9) An incoming-call number notification system comprising:
a plurality of telephones accommodated in an exchange; and
an incoming-call number notification apparatus described in any one of Supplementary notes 1 to 7, the incoming-call number notification apparatus being configured to operate for the plurality of telephones, wherein
each of the plurality of telephones blinks or lights up an incoming-call lamp of the own telephone in the determined display color in accordance with an instruction from the incoming-call number notification apparatus.

(Supplementary note 10) An incoming-call number notification program for causing a computer to function as an incoming-call number notification apparatus, the incoming-call number notification apparatus comprising a control unit configured to:
when there is an incoming call to a plurality of telephones accommodated in an exchange,
determine a display color according to the number of incoming calls at the present moment; and
instruct the plurality of telephones to blink or light up an incoming-call lamp of its own telephone in the determined display color.

INDUSTRIAL APPLICABILITY

The present invention is widely suitable for use in facilities using telephones. For example, the present invention is suitable for use in ordinary offices with dial-in contracts and call centers constructed by using a PBX alone.

Although the present invention is explained above with reference to embodiments, the present invention is not limited to the above-described embodiments. Various modifications that can be understood by those skilled in the art can be made to the configuration and details of the present invention within the scope of the invention.

This application is based upon and claims the benefit of priority from Japanese patent applications No. 2016-142973, filed on Jul. 21, 2016, the disclosure of which is incorporated herein in its entirety by reference.

REFERENCE SIGNS LIST

10 PBX
11 OUTSIDE-LINE INTERFACE
12 EXTENSION-LINE INTERFACE
13 CALL CONTROL CIRCUIT
14 CPU
15 MEMORY
20 EXTENSION TELEPHONE
20A A-th TELEPHONE GROUP
20B B-th TELEPHONE GROUP
20C C-th TELEPHONE GROUP
21 INCOMING-CALL LAMP
22 FUNCTION BUTTON GROUP
23 IMAGINARY EXTENSION BUTTON
24 HANDSET
30 DIAL-IN LINES

The invention claimed is:
1. An incoming-call number notification apparatus configured to enable an exchange to accept a dial-in incoming call and set a destination of the dial-in incoming call to an imaginary extension line, and thereby to enable a larger number of dial-in incoming calls than the number of telephones included in an extension-telephone group at the destination to wait in a response-waiting state while remaining in a calling state,
the incoming-call number notification apparatus comprising a control unit configured to:
when there is an incoming call to a plurality of telephones accommodated in the exchange,
determine a display color according to the number of incoming calls, the number of incoming calls being equal to a sum total of the number of calls in a calling state and the number of calls in progress; and instruct the plurality of telephones to blink or light up incoming-call lamps of the plurality of telephones in the determined display color irrespective of whether or not they are in a busy state.

2. The incoming-call number notification apparatus according to claim 1, wherein the control unit determines the display color so the display color that is used when the number of incoming calls at the present moment is equal to or less than the number of the plurality of telephones differs from the display color that is used when the number of incoming calls at the present moment is greater than the number of the plurality of telephones.

3. The incoming-call number notification apparatus according to claim 1, wherein when the number of incoming calls at the present moment is greater than the number of the plurality of telephones, the control unit determines the display color so that as a difference between the number of incoming calls and the number of the plurality of telephones increases, the display color is changed.

4. The incoming-call number notification apparatus according to claim 1, wherein the control unit instructs a telephone that is dealing with one of the incoming calls to blink or light up an incoming-call lamp of its own telephone in the determined display color.

5. The incoming-call number notification apparatus according to claim 1, wherein
when the number of display colors that the incoming-call lamps of the plurality of telephones can emit is n (n is a natural number no less than four),
the control unit determines that a first color is used as the display color when the number of incoming calls at the present moment is equal to or less than the number of the plurality of telephones,
the control unit determines that a different color, such as a second color, a third color, and so on, is used as the display color every time a difference between the number of incoming calls moment and the number of the plurality of telephones is increased by one, and
the control unit determines that an n-th color is used as the display color when the number of incoming calls reaches or exceeds a number corresponding to the n-th color.

6. The incoming-call number notification apparatus according to claim 1, wherein the control unit operates for a plurality of telephones assigned to one imaginary extension line.

7. An exchange comprising:
call control unit for performing call control for the plurality of telephones accommodated in the own exchange; and
an incoming-call number notification apparatus according to claim 1, wherein
the control unit included in the incoming-call number notification apparatus operates for the plurality of telephones accommodated in the own exchange.

8. An incoming-call number notification system comprising:
a plurality of telephones accommodated in an exchange; and
an incoming-call number notification apparatus according to claim 1, the incoming-call number notification apparatus being configured to operate for the plurality of telephones, wherein
each of the plurality of telephones blinks or lights up an incoming-call lamp of the own telephone in the determined display color in accordance with an instruction from the incoming-call number notification apparatus.

9. A non-transitory computer readable medium storing an incoming-call number notification program for causing a computer to function as an incoming-call number notification apparatus, the incoming-call number notification apparatus being configured to enable an exchange to accept a dial-in incoming call and set a destination of the dial-in incoming call to an imaginary extension line, and thereby to enable a larger number of dial-in incoming calls than the number of telephones included in an extension-telephone group at the destination to wait in a response-waiting state while remaining in a calling state, the incoming-call number notification apparatus comprising a control unit configured to:
when there is an incoming call to a plurality of telephones accommodated in the exchange,
determine a display color according to the number of incoming calls, the number of incoming calls being equal to a sum total of the number of calls in a calling state and the number of calls in progress; and
instruct the plurality of telephones to blink or light up incoming-call lamps of the plurality of telephones in the determined display color irrespective of whether or not they are in a busy state.

* * * * *

UNITED STATES PATENT AND TRADEMARK OFFICE
CERTIFICATE OF CORRECTION

PATENT NO. : 10,397,409 B2
APPLICATION NO. : 15/770512
DATED : August 27, 2019
INVENTOR(S) : Kotaro Miyata and Sakae Kamimura It is certified that error appears in the above-identified patent and that said Letters Patent is hereby corrected as shown below:

In the Specification

Column 16, Industrial Applicability, Lines 28-31; After "invention.", delete "¶This application is based upon and claims the benefit of priority from Japanese patent applications No. 2016-142973, filed on Jul. 21, 2016, the disclosure of which is incorporated herein in its entirety by reference."

In the Claims

Column 17, Line 37; In Claim 5, after "incoming calls", insert --at the present--

Signed and Sealed this
Twenty-eighth Day of January, 2020

Andrei Iancu
*Director of the United States Patent and Trademark Office*